United States Patent
Zhang et al.

(10) Patent No.: US 11,128,450 B2
(45) Date of Patent: Sep. 21, 2021

(54) SIGNATURE GENERATION METHOD, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Jian Jun Zhang, Shenzhen (CN); Li Lei Wu, Shenzhen (CN); Hai Tao Tu, Shenzhen (CN); Mao Cai Li, Shenzhen (CN); Li Kong, Shenzhen (CN); Zi Chao Tang, Shenzhen (CN); Wen Wei Zou, Shenzhen (CN); Jun Zang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 30 days.

(21) Appl. No.: 16/676,902

(22) Filed: Nov. 7, 2019

(65) Prior Publication Data

US 2020/0076586 A1    Mar. 5, 2020

Related U.S. Application Data

(63) Continuation of application No. PCT/CN2018/111928, filed on Oct. 25, 2018.

(30) Foreign Application Priority Data

Nov. 10, 2017   (CN) .......................... 201711106750.7

(51) Int. Cl.
*H04L 9/08*    (2006.01)
*G06F 16/182*  (2019.01)

(52) U.S. Cl.
CPC ........ *H04L 9/0841* (2013.01); *G06F 16/1834* (2019.01); *H04L 9/085* (2013.01); *H04L 9/0833* (2013.01)

(58) Field of Classification Search
CPC ...... H04L 9/0841; H04L 9/26; G06F 16/1834
See application file for complete search history.

(56) References Cited

U.S. PATENT DOCUMENTS 8,458,484 B2 *   6/2013   Burke .................. H04L 9/3231
                                                  713/184
9,699,172 B2 *   7/2017   Moulin ................. H04L 63/061
(Continued)

FOREIGN PATENT DOCUMENTS

CN   105162760 A   12/2015
CN   105406970 A   3/2016
(Continued)

OTHER PUBLICATIONS

Chinese Office Action for 201711106750.7 dated Sep. 17, 2019.
(Continued)

*Primary Examiner* — Lynn D Feild
*Assistant Examiner* — Viral S Lakhia
(74) *Attorney, Agent, or Firm* — Sughrue Mion, PLLC

(57) ABSTRACT

A signature generation method performed by an electronic apparatus is provided. A message abstract is generated according to a to-be-signed message and eigenvalues of a plurality of signature parties, an eigenvalue of a signature party being based on a random number of the signature party. Public keys and sub signatures of the plurality of signature parties are obtained, and a sub signature of the signature party is based on the random number of the signature party, the message abstract, and private keys of the plurality of signature parties. An aggregation public key is generated according to the public keys of the plurality of
(Continued)

US 11,128,450 B2

Page 2 signature parties, and a length of the aggregation public key is less than a length of the plurality of public keys after splicing. An aggregation signature is generated according to a sum value of the plurality of sub signatures and the message abstract.

17 Claims, 10 Drawing Sheets

(56) References Cited

U.S. PATENT DOCUMENTS

| | | | | |
|---|---|---|---|---|
| 9,853,977 | B1* | 12/2017 | Laucius | H04L 9/321 |
| 9,948,460 | B2* | 4/2018 | Cheng | H04L 9/12 |
| 10,237,760 | B2* | 3/2019 | Negus | H04W 24/02 |
| 10,511,445 | B1* | 12/2019 | Rubin | H04L 9/3247 |
| 10,567,377 | B2* | 2/2020 | Lewison | H04L 9/3268 |
| 10,608,824 | B1* | 3/2020 | Praus | H04L 9/14 |
| 10,862,831 | B2* | 12/2020 | Sherkin | H04L 9/0822 |
| 2010/0042842 | A1* | 2/2010 | Huang | H04L 9/3236 |
| | | | | 713/176 |
| 2014/0304505 | A1* | 10/2014 | Dawson | H04L 63/0428 |
| | | | | 713/165 |
| 2017/0249456 | A1* | 8/2017 | Fu | H04L 63/123 |
| 2017/0272250 | A1* | 9/2017 | Kaliski, Jr. | H04L 9/3265 |
| 2018/0183592 | A1* | 6/2018 | Campagna | H04L 9/30 |
| 2018/0183602 | A1* | 6/2018 | Campagna | H04L 9/0861 |
| 2018/0183774 | A1* | 6/2018 | Campagna | H04L 9/3247 |
| 2018/0359096 | A1* | 12/2018 | Ford | H04L 9/3236 |
| 2019/0098080 | A1* | 3/2019 | Bermudez | H04L 63/1458 |

FOREIGN PATENT DOCUMENTS

| | | |
|---|---|---|
| CN | 105721413 A | 6/2016 |
| CN | 106549909 A | 3/2017 |
| CN | 107968708 A | 4/2018 |
| GB | 2538022 A | 11/2016 |
| WO | 2017/186317 A1 | 11/2017 |

OTHER PUBLICATIONS

International Search Report for PCT/CN2018/111928 dated Dec. 26, 2018 [PCT/ISA/210].
Communication dated Feb. 9, 2021 from the Japanese Patent Office in Application No. 2019-563382.
Communication dated Feb. 17, 2021 from the Intellectual Property of India in Application No. 201937047283.
Zhang Jun, "A Combination Multi-signature Scheme", International Conference on Networking and Digital Society, 2009, vol. 2, pp. 16-19, Abstract Only.
Ewa Syta et al., "Keeping Authorities "Honest or Bust" with Decentralized Witness Cosigning", IEEE Symposium on Security and Privacy, 2016, pp. 526-545 (20 pages total).
Communication dated Jul. 15, 2021, from the European Patent Office in application No. 18876963.2.
Communication dated Jul. 22, 2021, from the Korean Intellectual Property Office in application No. 10-2019-7035599.

* cited by examiner

SIGNATURE GENERATION METHOD, ELECTRONIC DEVICE, AND STORAGE MEDIUM

CROSS-REFERENCE TO RELATED APPLICATION(S)

This application is a continuation application of International Application No. PCT/CN2018/111928, filed on Oct. 25, 2018, which claims priority to Chinese Patent Application No. 201711106750.7, entitled "SIGNATURE GENERATION METHOD AND APPARATUS, TERMINAL, AND SERVER" and filed on Nov. 10, 2017, the disclosures of which are incorporated by reference in their entireties.

BACKGROUND

1. Field

Example embodiments of the disclosure relate to the field of information technologies, and in particular, to a signature generation method, an electronic apparatus, and a storage medium.

2. Description of the Related Art

With constant development of information technologies, a block chain, as a brand new technology, has been rapidly developed. A block chain is a string of associated blocks that are generated by using a cryptography method. Block data of each block on the block chain is associated with block data in a previous block. Therefore, no cheating can be performed by tampering block data. It can be ensured that block data on any block is open and transparent. The block chain is composed of a lot of nodes to jointly form an end-to-end network. The data exchange between nodes is verified by using digital signature technology. The digital signature technology is a technology for authenticating digital information through digital encryption. In some cases, for example, when a transaction requires a consensus between a plurality of parties, the plurality of parties will sign a message, and such a signature manner is referred to as a multi-signature manner.

In the related art technology, an implementation scheme of the multi-signature manner is: assuming that there are N signature parties (N being an integer greater than 1), when the multi-signature is performed, N different signatures are connected in series and spliced into a long signature for storage into a block chain. During signature check, public keys of the N signature parties are required at the same time to verify the long signature. Therefore, the related art technology has a problem that signature check has high complexity

SUMMARY

One or more example embodiments provide a signature generation method, an electronic apparatus, and a storage medium, to reduce complexity of signature check.

According to an aspect of an example embodiment, there is provided a signature generation method performed by an electronic apparatus. A message abstract is generated according to a to-be-signed message and eigenvalues of a plurality of signature parties, an eigenvalue of a signature party being based on a random number of the signature party. Public keys and sub signatures of the plurality of signature parties are obtained, and a sub signature of the signature party is based on the random number of the signature party, the message abstract, and private keys of the plurality of signature parties. An aggregation public key is generated according to the public keys of the plurality of signature parties, and a length of the aggregation public key is less than a length of the plurality of public keys after splicing. An aggregation signature is generated according to a sum value of the plurality of sub signatures and the message abstract.

The generating the message abstract may include: obtaining the eigenvalues of the plurality of signature parties, the to-be-signed message, and a first value; generating an aggregation eigenvalue according to the eigenvalues of the plurality of signature parties and the first value; and generating the message abstract according to the aggregation eigenvalue, the to-be-signed message, and a preset one-way hash function.

The generating the aggregation eigenvalue may include: calculating a product of the plurality of eigenvalues, and generating the aggregation eigenvalue according to the product of the plurality of eigenvalues and the first value.

The generating the aggregation public key may include: calculating a product of the plurality of public keys, and generating the aggregation public key according to the product of the plurality of public keys and the first value.

The generating the aggregation signature may include: generating an aggregation sub signature according to the plurality of sub signatures, splicing the aggregation sub signature and the message abstract, and generating the aggregation signature based on a result of the splicing.

The electronic apparatus may correspond to a client device in a data sharing system, the plurality of signature parties correspond to a plurality of account addresses provided by the client device, and the to-be-signed message may contain value transfer information corresponding to each account address.

The electronic apparatus may correspond to a client device in a data sharing system, and the to-be-signed message may contain contract data used to limit a condition of completing a transaction.

The electronic apparatus may correspond to a leader node in a data sharing system, each of the plurality of signature parties may correspond to a follower node in the data sharing system, and the obtaining public keys and sub signatures of the plurality of signature parties may include receiving a public key and a sub signature that are sent by each follower node. The method may further include: transmitting the message abstract to the follower node in the data sharing system; and transmitting the aggregation public key and the aggregation signature to each follower node.

According to an aspect of an example embodiment, there is provided a signature generation method. A random number is obtained, and an eigenvalue is generated according to the random number. A to-be-signed message, a private key, and a public key are obtained. A message abstract is obtained, the message abstract being based on the to-be-signed message and the eigenvalue. A sub signature is generated according to the message abstract, the random number, and the private key.

The obtaining the random number, and the generating the eigenvalue according to the random number may include: obtaining a first value p and a second value q, the first value p and the second value q being primes, q being a factor of $(p-1)$, $p \geq 2^{512}$, and $q \geq 2^{140}$; obtaining a generation base g, g satisfying that $(g^q - 1)$ can be exactly divided by p; obtaining the random number, a value range of the random number being (0, q); and generating the eigenvalue according to the random number, the generation base, and the first value.

The method may be applied to a follower node in a data sharing node, and the method may further include: transmitting the sub signature and the public key to a signature aggregation party.

According to an aspect of an example embodiment, there is provided an electronic apparatus, including: at least one memory operable to store program code; and at least one processor operable to read the program code and operate as instructed by the program code, the program code including: first generation code configured to cause at least one of the at least one processor to generate a message abstract according to a to-be-signed message and eigenvalues of a plurality of signature parties, an eigenvalue of a signature party being based on a random number of the signature party; obtainment code configured to cause at least one of the at least one processor to obtain public keys and sub signatures of the plurality of signature parties, a sub signature of the signature party being based on the random number of the signature party, the message abstract, and private keys of the plurality of signature parties; second generation code configured to cause at least one of the at least one processor to generate an aggregation public key according to the public keys of the plurality of signature parties, a length of the aggregation public key being less than a length of the plurality of public keys after splicing; and third generation code configured to cause at least one of the at least one processor to generate an aggregation signature according to a sum value of the plurality of sub signatures and the message abstract.

The first generation code may cause at least one of the at least one processor to: obtain the eigenvalues of the plurality of signature parties, the to-be-signed message, and a first value; generate an aggregation eigenvalue according to the eigenvalues of the plurality of signature parties and the first value; and generate the message abstract according to the aggregation eigenvalue, the to-be-signed message, and a preset one-way hash function.

The first generation code may cause at least one of the at least one processor to generate the aggregation eigenvalue by performing: calculating a product of the plurality of eigenvalues, and generating the aggregation eigenvalue according to the product of the plurality of eigenvalues and the first value.

The first generation code may cause at least one of the at least one processor to generate the aggregation eigenvalue by performing: calculating a product of the plurality of public keys, and generating the aggregation public key according to the product of the plurality of public keys and the first value.

The second generation code may cause at least one of the at least one processor to: generate an aggregation sub signature according to the plurality of sub signatures, splice the aggregation sub signature and the message abstract, and generate the aggregation signature based on a result of splicing.

The electronic apparatus may correspond to a client device in a data sharing system, the plurality of signature parties may correspond to a plurality of account addresses provided by the client device, and the to-be-signed message may contain value transfer information corresponding to each account address.

The electronic apparatus may correspond to a client device in a data sharing system, and the to-be-signed message contains contract data used to limit a condition of completing a transaction.

The electronic apparatus may correspond to a leader node in a data sharing system, and each of the plurality of signature parties may be a follower node in the data sharing system; the electronic apparatus may further include: a transceiver, configured to transmit the message abstract to the follower node in the data sharing system, the transceiver may be further configured to receive a public key and a sub signature that are sent by each follower node, and the program code may further include transmission code configured to cause at least one of the at least one processor to transmit the aggregation public key and the aggregation signature to each follower node.

According to an aspect of an example embodiment, there is provided a non-transitory computer-readable storage medium, storing a computer program executable by at least one processor to perform: generating a message abstract according to a to-be-signed message and eigenvalues of a plurality of signature parties, an eigenvalue of a signature party being based on a random number of the signature party; obtaining public keys and sub signatures of the plurality of signature parties, a sub signature of a signature party being based on the random number of the signature party, the message abstract, and private keys of the plurality of signature parties; generating an aggregation public key according to the public keys of the plurality of signature parties, a length of the aggregation public key being less than a length of the plurality of public keys after splicing; and generating an aggregation signature according to a sum value of the plurality of sub signatures and the message abstract.

The beneficial effects brought by the technical solutions of the embodiments of this application are that: an aggregation signature is generated by using sub signatures of a plurality of signature parties, and an aggregation public key is generated based on public keys of a plurality of signature parties; the length of the obtained aggregation signature is less than that of a multi-signature obtained by splicing the plurality of sub signatures, and the length of the aggregation public key is less than that of a multi public key obtained by splicing the plurality of public keys; therefore, during network transmission of the aggregation signature and the aggregation public key, burden of network transmission is reduced, and the storage space is reduced during storage, and during signature check, a to-be-signed message is checked directly using the aggregation public key and the aggregation signature, to greatly reduce the complexity of signature check.

BRIEF DESCRIPTION OF THE DRAWINGS

These and/or other aspects will become apparent and more readily appreciated from the following description of the embodiments, taken in conjunction with the accompanying drawings. Apparently, the accompanying drawings in the following description show merely some embodiments, and a person of ordinary skill in the art may still derive other drawings from these accompanying drawings without creative efforts.

DETAILED DESCRIPTION

To make objectives, technical solutions, and advantages of the disclosure clearer, the following further describes in detail implementations of the disclosure with reference to the accompanying drawings.

Figure 1:
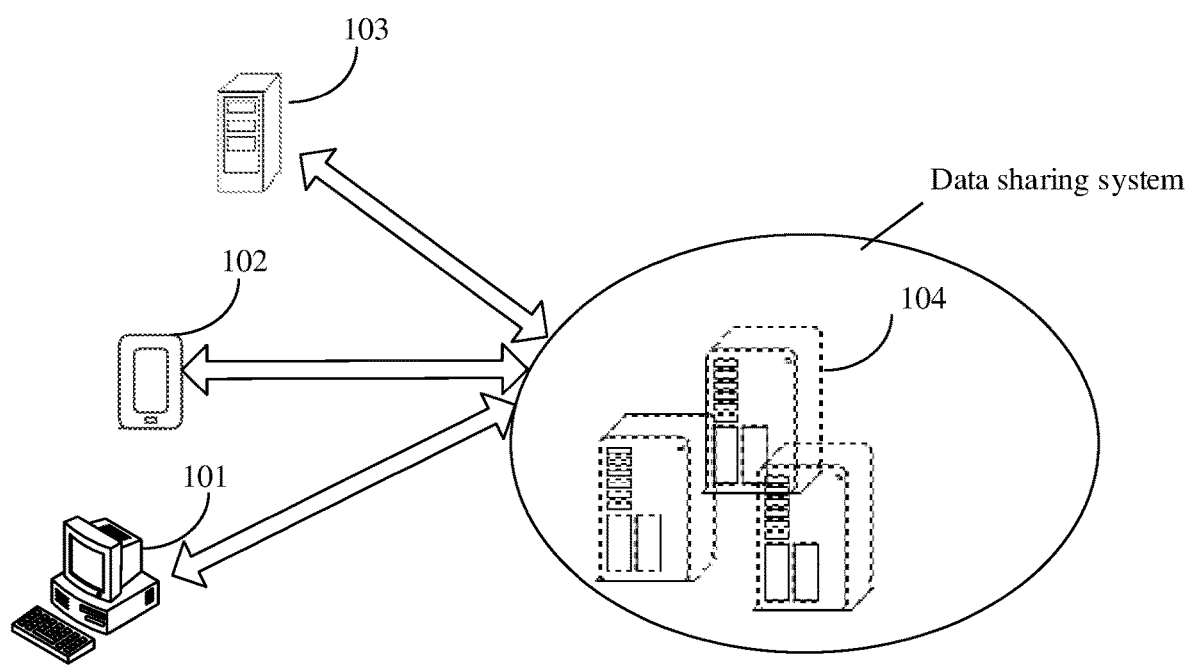
FIG. 1 is a diagram of an implementation environment according to an example embodiment.

A data sharing system 100 according to an example embodiment is described with reference to FIG. 1. The data sharing system 100 is a system for data sharing between nodes. The data sharing system may include a plurality of nodes 101, 102, and 103, and a plurality of nodes 101-103 may be client devices in the data sharing system, and the data sharing system may configured one or more block chains, for storing information and data. Each of the nodes 101-103 may receive input information during normal work, and maintains shared data in the data sharing system based on the received input information.

To ensure information interworking in the data sharing system, an information connection may be established between nodes in the data sharing system, so that information can be transmitted between the nodes via the information connection. Communication may be performed between the nodes and trust is achieved. A digital signature technology needs to be relied upon, and mainly implements identity confirmation, information authenticity and integrity authentication. For example, when any node in the data sharing system receives input information, after successful verification of this node, the information will be broadcast to another node. In a process of reaching a consensus between nodes, the nodes need to verify a signature, and the consensus can be reached provided that a certain number of node verifications succeed. After the consensus is reached, the input information is used as shared data for storage, so that data stored on all nodes in the data sharing system is consistent. The data sharing system may be a transaction system, and the transaction system is a system for financial transaction. The transaction system may include a plurality of nodes. Each node generates ledger data during transaction, and maintains a shared ledger in the transaction system based on the ledger data.

During application of a block chain technology, when a transaction needs to be signed by more than one user to be sent to a block chain, a multi-signature technology is needed. Namely, a signature aggregation party generates an aggregation signature and an aggregation public key according to signatures and public keys of a plurality of users, and during signature check, a signed message only needs to be checked according to the aggregation signature and the aggregation public key. In an actual application scenario, in a signature generation process, after receiving a trigger instruction of generating a signature, a plurality of signature parties select a random number, and generate an eigenvalue according to the random number. The signature aggregation party generates a message abstract according to a to-be-signed message and eigenvalues of a plurality of signature parties. The plurality of signature parties obtain the message abstract (the message abstract is obtained through calculation by the signature aggregation party according to the to-be-signed message and eigenvalues), and then generate sub signatures according to the message abstract, the random number, and a private key. The signature aggregation party obtains the public keys and sub signatures of the plurality of signature parties. Then, the signature aggregation party generates an aggregation public key according to the public keys of the plurality of signature parties. The signature aggregation party generates an aggregation signature according to the plurality of sub signatures (for example, a sum value of the sub signatures) and the message abstract.

The client device and nodes of the data sharing system may further have at least one database, for storing the random number, the sub signatures, the message abstract, the aggregation signature, the aggregation public key, and the like.

The solutions according to the disclosure are described in detail below by using three example implementation scenarios.

Figure 2:
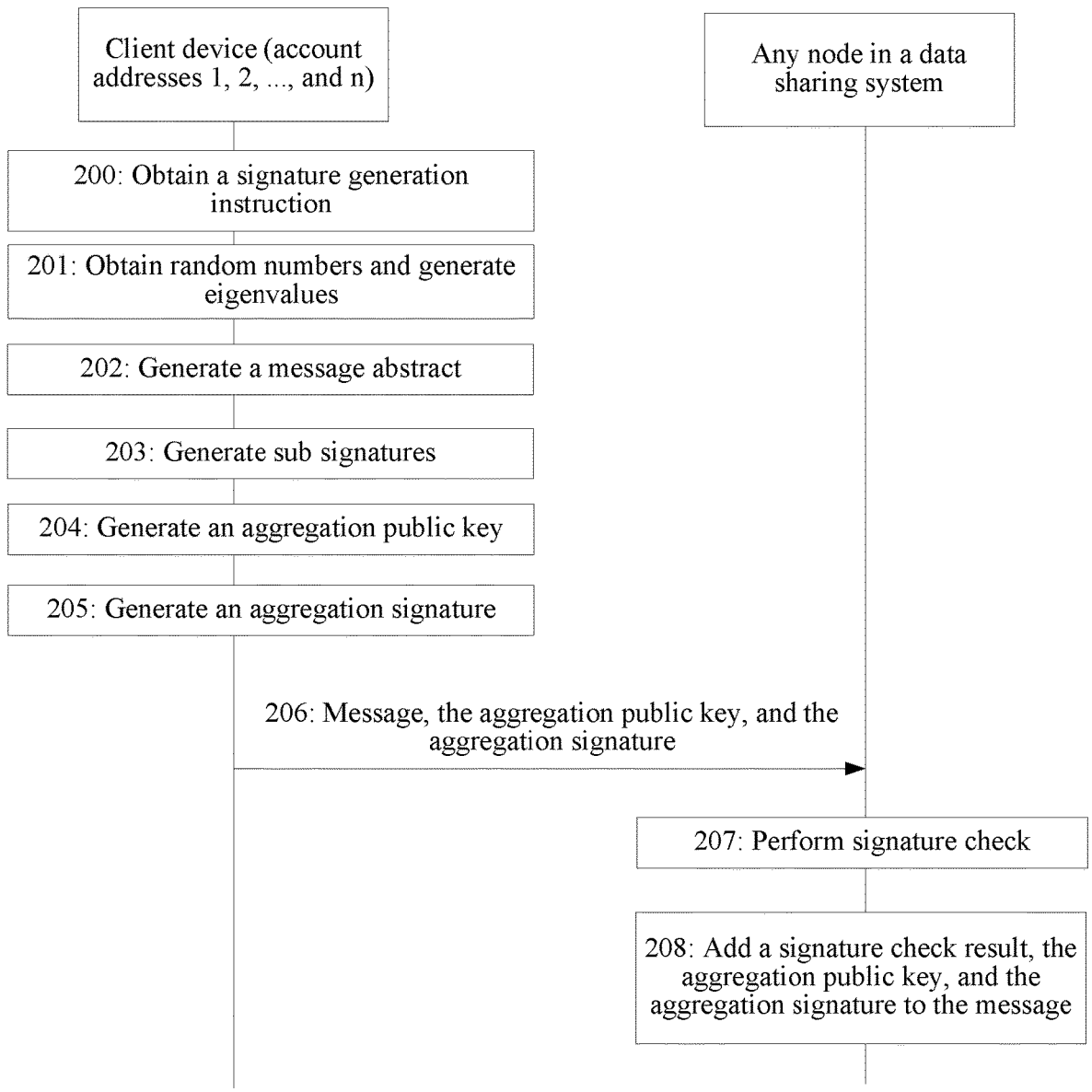
FIG. 2 is a flowchart of signature generation according to an example embodiment.

FIG. 2 is a flowchart of a signature generation method according to an example embodiment. For example, the method is applied to a client device in a data sharing system, and a plurality of signature parties is a plurality of account addresses provided by the client device. In this case, the plurality of signature parties and a signature aggregation party are on a same client device in a same data sharing system. Namely, the plurality of signature parties and the signature aggregation party have a same execution body, and a to-be-signed message contains a transfer amount corresponding to each account address, and some other transaction information. The signature generation method as shown in FIG. 2 includes operations 200-208, which are described in detail below.

200: A client device obtains a signature generation instruction, the signature generation instruction being used to instruct to transfer from a plurality of account addresses to at least one account address and indicate transfer amounts of the plurality of account addresses.

Figure 3:
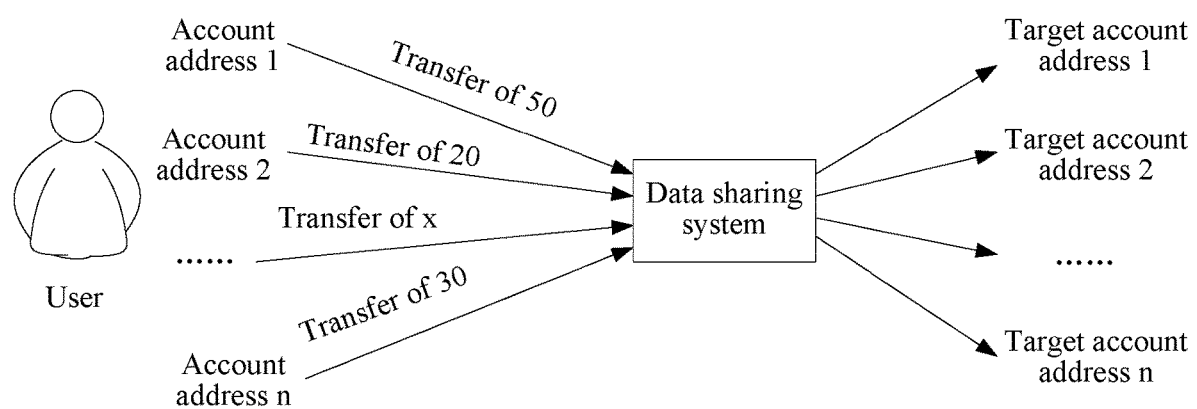
FIG. 3 is a schematic diagram of a scenario of transfer between a plurality of account addresses according to an example embodiment.

As shown in FIG. 3, assuming that a user has a plurality of account addresses, when the user needs to transfer assets in the plurality of account addresses to one or more target account addresses, the plurality of accounts is a plurality of signature parties. When the user operates a client device to perform transaction, the client device receives a transfer request. The transfer request carries a to-be-signed message in this transaction. Then, a signature generation instruction is triggered, so that the client device starts to generate a signature. The to-be-signed message may be the present transfer request, or an account address used as a transfer-out account in the present transfer request, a transfer amount of each account address, and an account address used as a transfer-in account.

201: The client device obtains a plurality of random numbers of the plurality of account addresses used as transfer-out accounts, and separately generates eigenvalues of the plurality of account addresses according to the plurality of random numbers.

After receiving the signature generation instruction, to distinguish between the plurality of account addresses in the client device, the client device selects respective random numbers for the plurality of account addresses, or obtains pre-stored respective random numbers of the plurality of account addresses, and then generates respective eigenvalues of the plurality of account addresses according to the plurality of random numbers.

Specifically, using an account address as an example, an execution body of the account address is a client device, and operation 200 may include the following operation 1 to operation 4.

Operation 1: A client device obtains a first value p and a second value q for the account address, the first value p and the second value q being primes, q being a factor of (p−1), $p \geq 2^{512}$, and $q \geq 2^{140}$.

The client device selects a prime in a range of $[2^{512},+\infty)$, determines the prime as the first value p, selects a prime in a range of $[2^{140},+\infty)$, and determines the prime as a second value q, so that the first value p and the second value q satisfy that q is a factor of (p−1). In addition to the foregoing manner, the client device may also take out the pre-stored first value p and second value q in a related database. The pre-stored first value p and second value q are both primes, and satisfy that q is a factor of (p−1), $p \geq 2^{512}$, and $q \geq 2^{140}$.

Operation 2: Obtain a generation base g, g satisfying that $(g^q-1)$ can be exactly divided by p.

The client device randomly selects a value, and determines the value as the generation base g, so that the generation base g satisfies that $(g^q-1)$ can be exactly divided by p. Alternatively, the client device obtains a pre-stored generation base g from a related database, and the generation base g satisfies that $(g^q-1)$ can be exactly divided by p.

Operation 3: Obtain a random number, a value range of the random number being (0,q).

The client device randomly selects a value in a range of (0,q), and determines the value as a random number. Alternatively, the client device obtains a pre-stored random number in a related database, and the random number satisfies that it falls within a range of (0,q).

Operation 4: Generate an eigenvalue according to the random number, the generation base, and the first value.

After obtaining the random number, the generation base, and the first value, the client device may calculate the eigenvalue of the account address according to the following formula (1):

$$R = g^r (\mod p) \quad (1)$$

R represents an eigenvalue, r represents a random number, g is a generation base, and p is a first value.

The client device may generate, according to operation 1 to operation 4, respective eigenvalues for the plurality of account addresses used as transfer-out accounts. Details are not described herein again. The generation process may be parallel. Namely, the client device obtains respective random numbers for the plurality of account addresses simultaneously, and generates respective eigenvalues for the plurality of account addresses according to the plurality of random numbers. The generation process may also be serial. Namely, the client device obtains a random number for an account address, and then generates an eigenvalue for the account address according to the random number. Then, the client device generates an eigenvalue for a next account address according to a random number thereof, until eigenvalues are generated for all account addresses, and then the operation is ended. However, this is merely an example and the disclosure is not limited herein.

202: The client device obtains a to-be-signed message and the eigenvalues of the plurality of account addresses, and generates a message abstract, the to-be-signed message including an account address used as a transfer-out account, a transfer amount of each account address, and an account address used as a transfer-in account.

After generating respective eigenvalues for the account addresses according to the foregoing process, the client device obtains the plurality of eigenvalues, and generates an aggregation eigenvalue according to the plurality of eigenvalues. Then, the client device generates the message abstract according to the obtained aggregation eigenvalue, the account address used as the transfer-out account, the transfer amount of each account address, the account address used as the transfer-in account, and a preset one-way hash function.

Specifically, operation 202 may include the following operation 1 to operation 3.

Operation 1: A client device obtains respective eigenvalues for a plurality of account addresses, and a to-be-signed message.

The client device may directly use a transfer request as the to-be-signed message, or extract the account address used as the transfer-out account, the transfer amount of each account address, and the account address used as the transfer-in account in the transfer request as the to-be-signed message. In this embodiment, description is provided only by using an example in which the to-be-signed message contains the extracted account address used as the transfer-out account, the transfer amount of each account address, and the account address used as the transfer-in account.

In this operation, the client device may pre-store the eigenvalues of the account addresses and the first value that are generated in operation 201. Before generating the message abstract, the client device may obtain the pre-stored eigenvalues of the account addresses and the first value.

Operation 2: The client device generates an aggregation eigenvalue according to respective eigenvalues of the plurality of account addresses and the first value.

In a specific calculation manner, the client device calculates a product of a plurality of eigenvalues, and generates an aggregation eigenvalue according to the product of the plurality of eigenvalues and the first value. Further, in the foregoing calculation process, the process in which the client device generates the aggregation eigenvalue according to the product of the plurality of eigenvalues and the first value may be performed through a modulo operation. The calculation formula may be the following formula (2):

$$R = \prod_{i=1}^{n} R_i (\mod p) \quad (2)$$

R represents an aggregation eigenvalue, n represents a total number of account addresses, $R_i$ represents an eigenvalue of an ith account address, mod represents a modulo operation, and p is a first value.

Operation 3: Generate the message abstract according to the aggregation eigenvalue, the to-be-signed message, and a preset one-way hash function.

A hash value of the message is obtained according to the foregoing generated aggregation eigenvalue, the to-be-signed message, and the preset one-way hash function. The hash value is the message abstract. The preset one-way hash function may be an SHA256 secure hash function.

Further, the message abstract may be calculated according to the following formula (3):

$$h = H(m, R) \quad (3)$$

h represents a message abstract, H( ) represents a hash value calculation operation, m represents a to-be-signed message, and R represents an aggregation eigenvalue.

203: The client device obtains private keys and public keys of the plurality of account addresses used as the transfer-out accounts, and generates sub signatures according to the message abstract, the random numbers, and the private keys.

After obtaining the message abstract, the client device may obtain private keys and public keys of the account addresses ready for transfer. The private keys and the public keys may be obtained in the following plurality of implementations: (1) a database may store a private key and a public key of each account address, and when the client device needs the private key and the public key, the client device may directly obtain the private key and the public key of each account address from the database; and (2) the client device temporarily generates the private key and the public key for each account address, the private key falling within a range of (0,q), q being the foregoing obtained second value, and the public key being generated according to the private key, the generation base, and the first value. A specific calculation formula may be the following formula (4):

$$X = g^x (\bmod p) \quad (4)$$

X represents a public key, x represents a private key, g is a generation base, p is a first value, and mod represents a modulo operation.

Then, the client device obtains the message abstract, the random number, and the second value that are generated in the foregoing process, and calculates a sub signature of each account address according to the private key, the message abstract, and the random value of each account address, and the second value. The calculation formula may be the following formula (5):

$$S_i = r_i + hx_i (\bmod q) \quad (5)$$

$S_i$ represents a sub signature of an ith account address, $r_i$ represents a random number of the ith account address, h represents a message abstract, $x_i$ represents a private key of the ith account address, q is a second value, and mod represents a modulo operation.

204: The client device obtains the public keys of the plurality of account addresses, and generates an aggregation public key according to the public keys of the plurality of account addresses.

After the client devices obtain the respective public keys for the account addresses according to the foregoing processing process, the client device generates the aggregation public key according to a product of the public keys and the first value. Further, in the foregoing calculation process, the client device obtains respective first values for the account addresses, calculates the product of the plurality of public keys, performs modulo operation according to the product of the plurality of public keys and the first value, and generates the aggregation public key. Calculation may be performed according to the following formula (6):

$$X = \prod_{i=1}^{n} X_i (\bmod p) \quad (6)$$

X represents an aggregation public key, Π represents quadrature operation, n represents the total number of account addresses, $X_i$ represents a public key of an ith account address, mod represents modulo operation, and p is a first value.

205: The client device generates an aggregation signature according to a sum value of the plurality of sub signatures and the message abstract.

Through the foregoing operation 203, the client device obtains respective sub signatures for the account addresses, adds the sub signatures to obtain a sum value of the plurality of sub signatures, determines the sum value as the aggregation sub signature, and then generates the aggregation signature according to the aggregation sub signature and the message abstract.

Further, in the foregoing calculation process, the sub signatures of the account addresses are added to obtain the sum value of the plurality of sub signatures, modulo operation is performed on the sum value and the second value, and the obtained result is determined as the aggregation sub signature, and calculation may be performed according to the following formula (7):

$$S = \sum_{i=1}^{n} S_i (\bmod q) \quad (7)$$

S represents an aggregation sub signature, Σ represents summation operation, n represents the total number of account addresses, $S_i$ represents a sub signature of an ith account address, mod represents modulo operation, and q is a second value.

After the aggregation sub signature is determined through the foregoing process, the aggregation sub signature and the message abstract are spliced, and a result obtained through splicing is determined as the aggregation signature. When the aggregation sub signature is determined through the foregoing process, because the aggregation sub signature is generated according to a sum value of sub signatures, the length of the obtained aggregation sub signature is far less than the length of the plurality of the sub signatures after splicing. Therefore, the length of the aggregation signature obtained according to the aggregation sub signature is less than the length of the signature obtained through splicing, the storage space can be reduced during storage, and during network transmission of the aggregation signature, burden of network transmission can be reduced.

In the foregoing operations, the eigenvalues, the message abstract, the sub signatures, the aggregation signature, the aggregation public key, and the like may be obtained through calculation, and the client device may store the obtained eigenvalues, message abstract, sub signatures, aggregation signature, aggregation public key, and the like. During storage, the client device may store all the generated results into a related database, or bind the results with respective account addresses for storage. However, this is merely an example and the disclosure is not limited herein.

The foregoing processes of generating the aggregation signature and generating the aggregation public key may be parallel. Namely, the client device may obtain respective sub signatures of all account addresses simultaneously, generate the aggregation sub signature according to a plurality of sub signatures, and generate the aggregation signature according to the aggregation sub signature and the message abstract. Similarly, the client device obtains respective public keys of all account addresses simultaneously, and generates the aggregation public key according to the plurality of public keys. Optionally, the foregoing processes of generating the aggregation signature and generating the aggregation public key may be serial. Namely, the client device may obtain a sub signature of a first account address and a sub signature of a second account address, and generate a partial aggregation sub signature according to the two sub signatures. Then, the client device may obtain a sub signature of a third account address, and generate a new partial aggregation sub signature according to the foregoing partial aggregation sub signature and the sub signature. Then, the client device may obtain a sub signature of a fourth account address, and generate a new partial aggregation sub signature according to the foregoing partial aggregation sub signature and the sub signature, and so on, until sub signatures of all the account addresses participate in generating the aggregation sub signature, and then the aggregation signature is generated according to the generated aggregation sub signature and the message abstract. However, this is merely an example and the disclosure is not limited herein.

206: The client device transmits the message, the aggregation public key, and the aggregation signature to any node in a data sharing system.

In this operation, the aggregation signature may be added to the message for transmission to the data sharing system, or the message and the aggregation signature may be sent to the data sharing system together. However, this is merely an example and the disclosure is not limited herein.

After the aggregation public key and the aggregation signature are generated in the foregoing process, the client device transmits the message, the aggregation public key, and the aggregation signature to the data sharing system, and the data sharing system performs signature check on the message.

207: Any node in the data sharing system performs signature check on the message according to the aggregation public key and the aggregation signature.

Specifically, the client device transmits the message, the generation base, and the first value of each account address and the aggregation public key and the aggregation signature to the data sharing system, and the data sharing system transmits the information to a node in the system. The node receiving the information performs signature check on the message according to the message, the generation base, and the first value of each account address and the aggregation public key and the aggregation signature. During the signature check, it is determined whether the following formula (8) is established; if yes, the signature check succeeds, and if not, the signature check fails.

$$h=H(m,g^s X^{-h}(\mod p)) \quad (8)$$

h represents a message abstract, H represents hash value calculation operation, m represents a message, g is a generation base, S represents an aggregation sub signature, X represents an aggregation public key, mod represents modulo operation, and p is a first value.

Correctness of the foregoing signature check method may be proved by using a mathematic method, and the specific proving method may be as follows:

According to the foregoing calculation method, the formula (8) $h=H(m,g^s X^{-h}(\mod p))$ is equivalent to $R=g^s X^{-h}(\mod p)$, and according to the Euclidean algorithm, the following may be obtained:

$$g^s X^{-h}(\mod p) = g^{\sum_{i=1}^{n} S_i(\mod q)} \left( \prod_{i=1}^{n} X_i(\mod p) \right)^{-h} (\mod p) =$$

-continued $$g^{\sum_{i=1}^{n}(r_i+hx_i)(\mod q)} \prod_{i=1}^{n} g^{-hx_i}(\mod p) =$$

$$g^{\sum_{i=1}^{n}(r_i+hx_i)(\mod q)} g^{\sum_{i=1}^{n}(-hx_i)}(\mod p) = R$$

Therefore, it may be derived that $g^s X^{-h}(\mod p)=R$. Because $h=H(m,g^s X^{-h}(\mod p))$ is equivalent to $R=g^s X^{-h}(\mod p)$, $h=H(m,g^s X^{-h}(\mod p))$ is established. Therefore, the foregoing signature check method is correct.

208. The data sharing system adds the signature check result, the aggregation public key, and the aggregation signature to the message.

The data sharing system adds the signature check result, the aggregation public key, and the aggregation signature into the message, and adds the message obtained after addition into a block chain.

In this application, an aggregation signature is generated by using sub signatures of a plurality of signature parties, and an aggregation public key is generated based on public keys of a plurality of signature parties; the length of the obtained aggregation signature is less than that of a multi-signature obtained by splicing the plurality of sub signatures, and the length of the aggregation public key is less than that of a multi public key obtained by splicing the plurality of public keys; therefore, during network transmission of the aggregation signature and the aggregation public key, burden of network transmission is reduced, and the storage space is reduced during storage, and during signature check, a signed message is checked directly using the aggregation public key and the aggregation signature, to greatly reduce the complexity of signature check. Further, specific application of the foregoing signature generation method in a transfer scenario is provided, so that practicability of signature generation is improved, and efficiency of signature generation and signature check in the transfer scenario is also improved.

Figure 4:
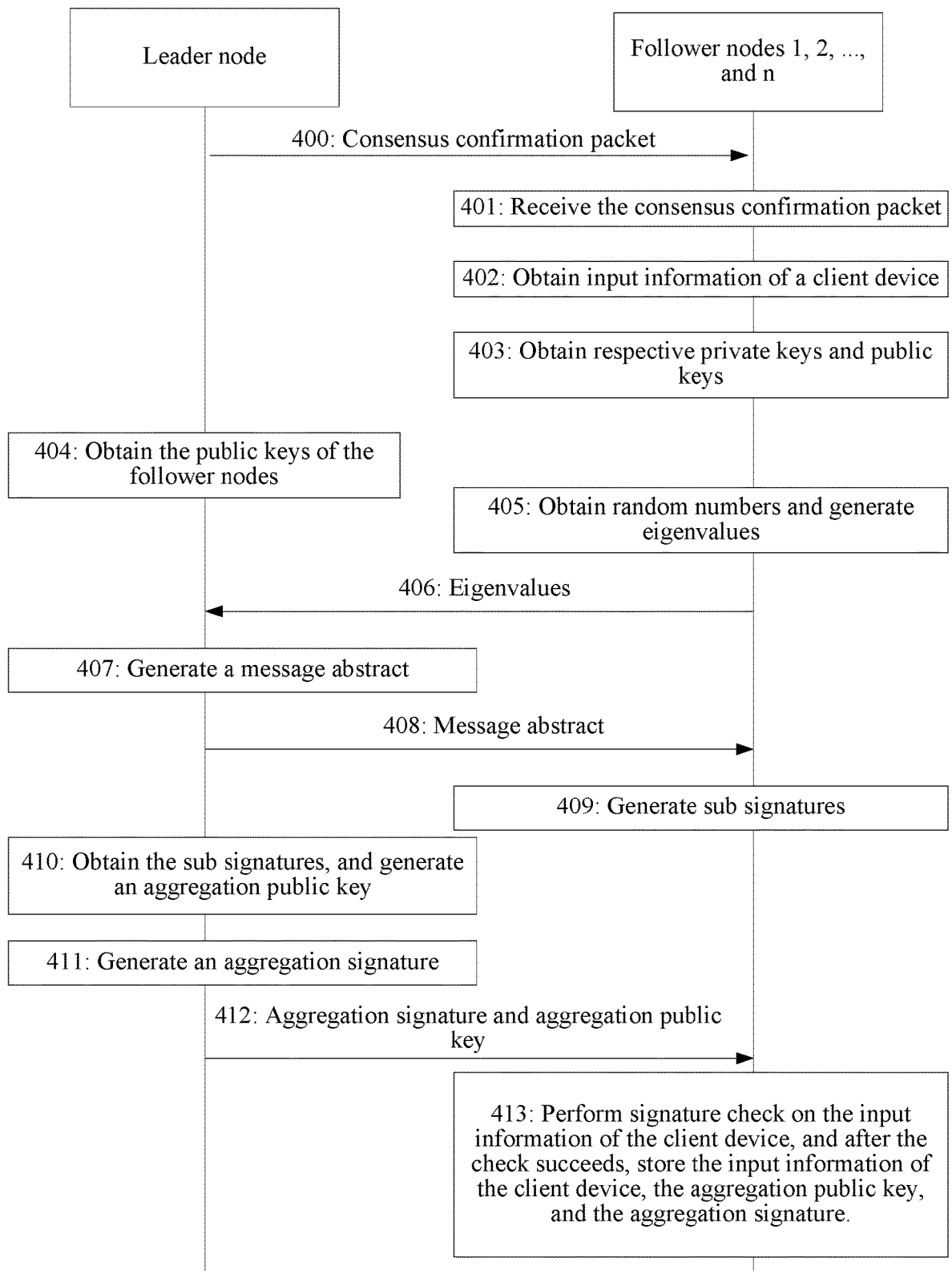
FIG. 4 is a flowchart of signature generation according to an example embodiment.

FIG. 4 is a flowchart of a signature generation method according to an example embodiment.

For example, the method of FIG. 4 may be applied to a leader node in a data sharing system. In this case, a signature aggregation party is the leader node in the data sharing system. Each of a plurality of signature parties is a follower node in the data sharing system. Any follower node may determine, according to heartbeat information broadcast by the leader node in the data sharing system, that the leader node runs normally, and copies a log based on an indication of the leader node. When the follower node does not receive the heartbeat information of the leader node in a period of time, the follower node may determine that the leader node has a fault in running, and the follower node broadcasts a voting request to each node in the data sharing node. Once receiving votes of more than a half of node devices in the cluster, the follower node may switch to a leader state for running, and broadcast the heartbeat information to each node device in the cluster, store a log based on interaction with the client device, and instruct each node to copy the log. The method of FIG. 4 includes operations 401 to 413, which are described in detail below.

400: A leader node transmits a consensus confirmation packet to each follower node, the consensus confirmation packet carrying input information of a client device.

Figure 5:
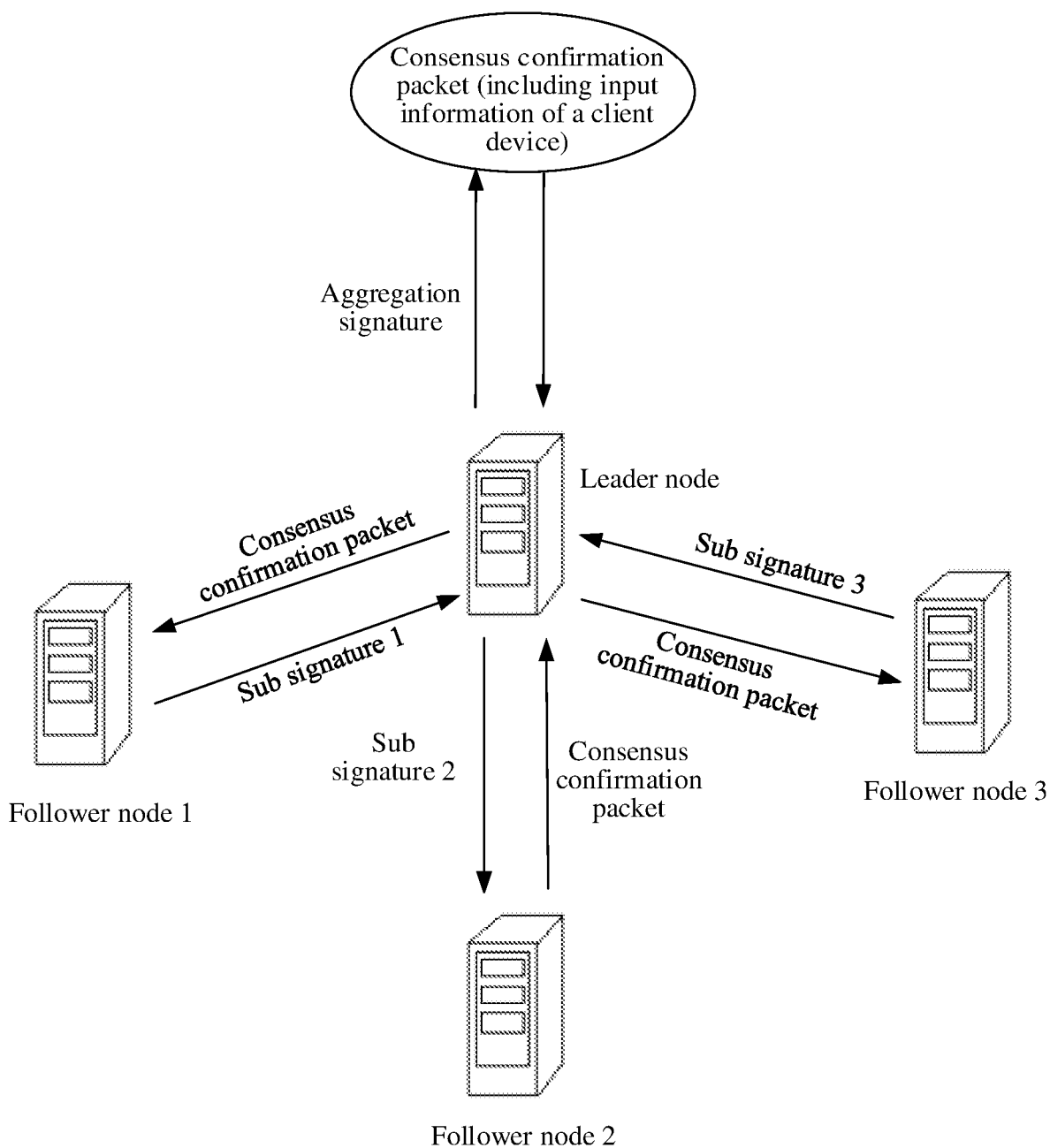
FIG. 5 is a schematic diagram of a process of reaching a consensus between nodes according to an example embodiment.

When a consensus between nodes is reached by using a bft-raft (consensus algorithm) in a credible block chain, as shown in FIG. 5, the leader node transmits the consensus confirmation packet to each follower node. The consensus confirmation packet is a data packet that needs to be stored after a consensus is reached on the packet between the nodes, and the consensus confirmation packet t carries a to-be-signed message. In this embodiment, description is provided only by using an example in which the to-be-signed message may be input information of the client device, such as a transfer message.

401: Each follower node receives the consensus confirmation packet.

After the leader node transmits the consensus confirmation packet, each follower node receives the consensus confirmation packet. The consensus confirmation packet carries the input information of the client device, and triggers each follower node to sign the input information of the client device.

402: Each follower node obtains input information of a client device from the consensus confirmation packet.

After receiving the consensus confirmation packet sent by the leader node, each follower node parses the consensus confirmation packet and obtains the input information of the client device.

403: Each follower node obtains a respective public key and private key.

After each follower node obtains the input information of the client device in the foregoing process, each follower node obtains the respective public key and private key, and the obtaining method may be processed with reference to operation 203, and details are not described herein again.

404: The leader node obtains the public key of each follower node.

After the foregoing operations are completed, the leader node obtains the public key of each follower node. The leader node may obtain the public key of each follower node in the following plurality of implementations: (1) a public key of each follower node may be stored in a database of the leader node, and when necessary, the leader node may directly obtain the public key of each account address from the database. (2) Each follower node may store the respective public key and private key in the respective database, and after obtaining the respective public key, each follower node transmits the public key to the leader node. In this case, after the follower node transmits the public key for the first time, the leader node may store the public key of the follower node, and when next time the leader node needs the public key of the follower node, reference may be made to the foregoing implementation (1) for processing. (3) Each follower node temporarily generates the private key and the public key, and reference may be made to the foregoing operation 203 for the generation calculation method, and details are not described herein again. Then, each follower node transmits the generated public key to the leader node. In this case, after the follower node transmits the public key for the first time, the leader node may store the public key of the follower node, and when next time the leader node needs the public key of the follower node, reference may be made to the foregoing implementation (1) for processing. Details are not described herein again.

405: Each follower node obtains a respective random number, and generates a respective eigenvalue according to the respective random number.

A method in which each follower node obtains the random number may be processed according to operation 3 in operation 201, and a method in which each follower node generates the eigenvalue according to the random number may be processed according to operation 4 in operation 201. Details are not described herein again. After generating the respective eigenvalue, each follower node transmits the respective eigenvalue to the leader node.

406: Each follower node transmits the respectively generated eigenvalue to the leader node.

407: After receiving the respective eigenvalue sent by each follower node, the leader node generates a message abstract according to input information of the client device and the eigenvalue of each follower node.

A calculation process of generating the message abstract may be processed according to operation 202, and details are not described herein again. After generating the message abstract, the leader node transmits the message abstract to each follower node.

408: The leader node transmits the message abstract to each follower node in the data sharing system.

409: Each follower node generates a sub signature according to the message abstract, the random number, and the private key.

A calculation process in which each follower node generates the sub signature may be processed according to operation 203, and details are not described herein again. After each follower node generates the respective sub signature in the foregoing operations, each follower node transmits the respective sub signature to the leader node.

410: The leader node receives the public key sent by each follower node, and generates an aggregation public key according to the public key of each follower node.

A calculation process in which the leader node generates the aggregation public key may be processed according to operation 204, and details are not described herein again.

411: The leader node generates an aggregation signature according to a sum value of the plurality of sub signatures and the message abstract.

A calculation process in which the leader node generates the aggregation signature may be processed according to operation 205, and details are not described herein again.

412: The leader node transmits the aggregation public key and the aggregation signature to each follower node.

The leader node adds the generated aggregation public key and the aggregation signature to the consensus confirmation packet, and then transmits the consensus confirmation packet to each follower node. Each follower node parses the consensus confirmation packet, and extracts the aggregation public key, the aggregation signature, and the input information of the client device therein. Then, each follower node performs signature check on the message according to the aggregation public key and the aggregation signature. The signature check process may be processed with reference to operation 207, and details are not described herein again.

413: After signature check performed by all follower nodes on the message succeeds, the nodes reach a consensus, and each node stores the input information of the client device in the consensus confirmation packet, the aggregation signature, and the aggregation public key.

After signature check is successfully performed on the message by each follower node according to the aggregation public key and the aggregation signature, a consensus is reached between the nodes. Then, each follower node stores the input information of the client device in the consensus confirmation packet, the aggregation signature, and the aggregation public key.

The length of the aggregation signature obtained in the foregoing process is less than the length of the signature obtained through splicing, and the length of the aggregation public key is less than the length of the public key obtained through splicing. Therefore, in a consensus process, during network transmission of the aggregation signature, burden of network transmission can be reduced, and when signature check is performed on a message, signature check needs to be performed on the message only according to the aggregation public key and the aggregation signature, so that complexity of signature check is reduced.

Figure 6:
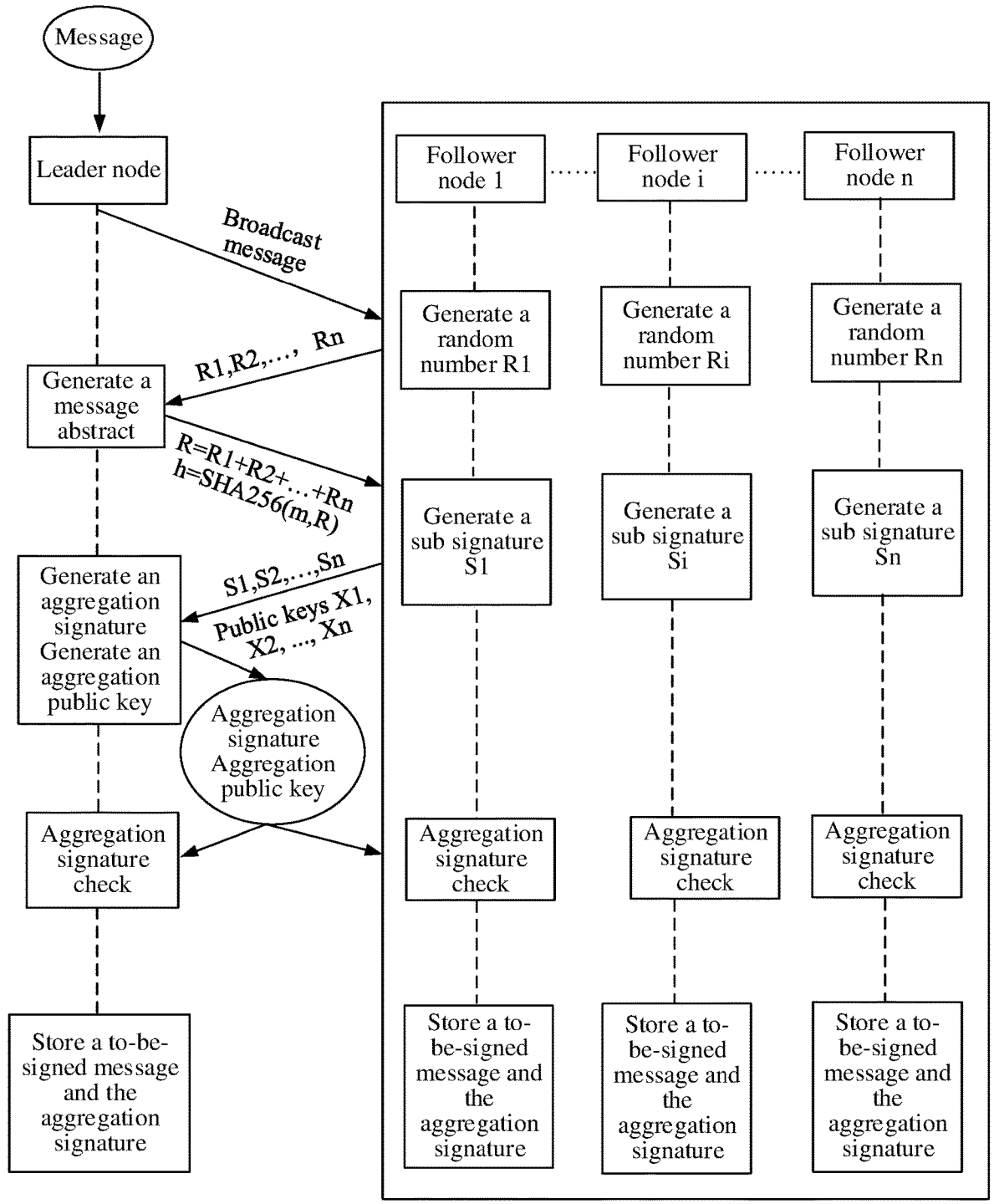
FIG. 6 is a schematic diagram of signature generation in a parallel manner according to an example embodiment.

The process of generating the aggregation signature and the aggregation public key may be parallel. As shown in FIG. 6, the leader node generates the aggregation sub signature according to a plurality of sub signatures, and then generates the aggregation signature according to the aggregation sub signature and the message abstract. Similarly, the leader node generates the aggregation public key according to a plurality of public keys. Optionally, the process of generating the aggregation signature and the aggregation public key may also be serial. Namely, the first follower node obtains its sub signature, and then transmits it to the second follower node; the second follower node obtains the sub signature of the first follower node and a sub signature of the second follower node, and generates a partial aggregation sub signature, and then transmits the partial aggregation sub signature to the third follower node; the third follower node obtains the partial aggregation sub signature sent by the second follower node and a sub signature of the third follower node, and generates a new partial aggregation sub signature, and then transmits the new partial aggregation sub signature to the fourth follower node, and so on, until the last follower node generates a new partial aggregation sub signature, and transmits the partial aggregation sub signature to the leader node; the leader node receives the partial aggregation sub signature, and determines the partial aggregation sub signature as the aggregation sub signature, and then generates the aggregation signature according to the generated aggregation sub signature and the message abstract. However, this is merely an example and the disclosure is not limited herein.

In the disclosure, an aggregation signature is generated by using sub signatures of a plurality of signature parties, and an aggregation public key is generated based on public keys of a plurality of signature parties; the length of the obtained aggregation signature is less than that of a multi-signature obtained by splicing the plurality of sub signatures, and the length of the aggregation public key is less than that of a multi public key obtained by splicing the plurality of public keys; therefore, during network transmission of the aggregation signature and the aggregation public key, burden of network transmission is reduced, and the storage space is reduced during storage, and during signature check, a signed message is checked directly using the aggregation public key and the aggregation signature, to greatly reduce the complexity of signature check. Further, specific application of the foregoing signature generation method in a consensus scenario is provided, so that practicability of signature generation is improved, and efficiency of signature generation and signature check in the consensus scenario is also improved.

Figure 7:
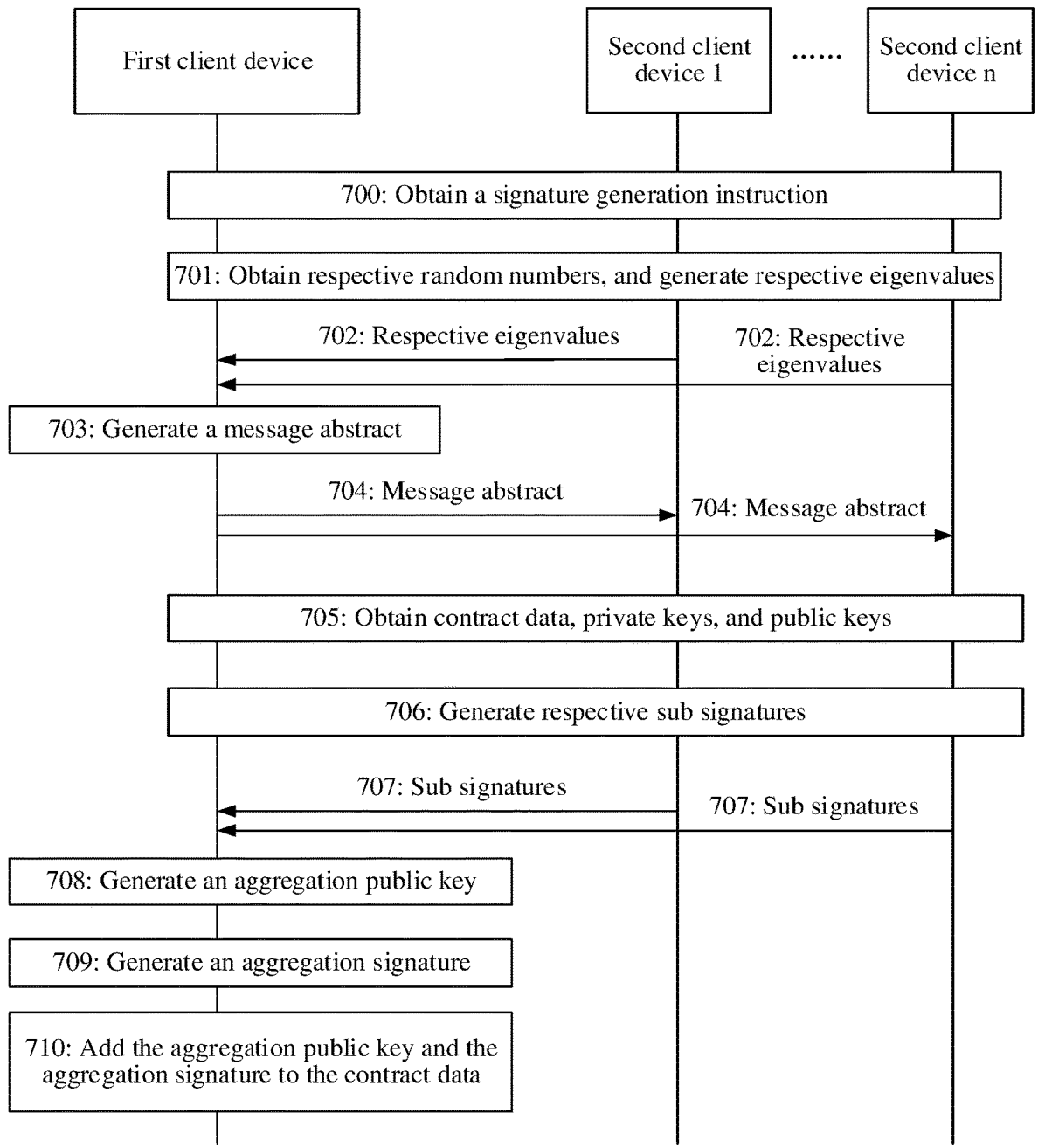
FIG. 7 is a flowchart of signature generation according to an example embodiment.

FIG. 7 is a flowchart of a signature generation method according to an example embodiment.

For example, the method of FIG. 7 may be applied to a client device in a data sharing system, and a client device on which any of a plurality of signature parties is located is used as an execution body that executes aggregation signature. In this case, to facilitate description, a client device used as a signature aggregation party in client devices that participate in an intelligent contract is referred to as a first client device, and another client device that participates in the intelligent contract is referred to as a second client device. In an intelligent contract scenario, a to-be-signed message contains contract data, and the contract data is used to limit a condition of completing a transaction. The method of FIG. 7 includes operations 700-710, which are described in detail below.

700: A first client device and at least one second client device obtain a signature generation instruction, the signature generation instruction being used to indicate contract content of a plurality of contract parties and a transfer amount.

Figure 8:
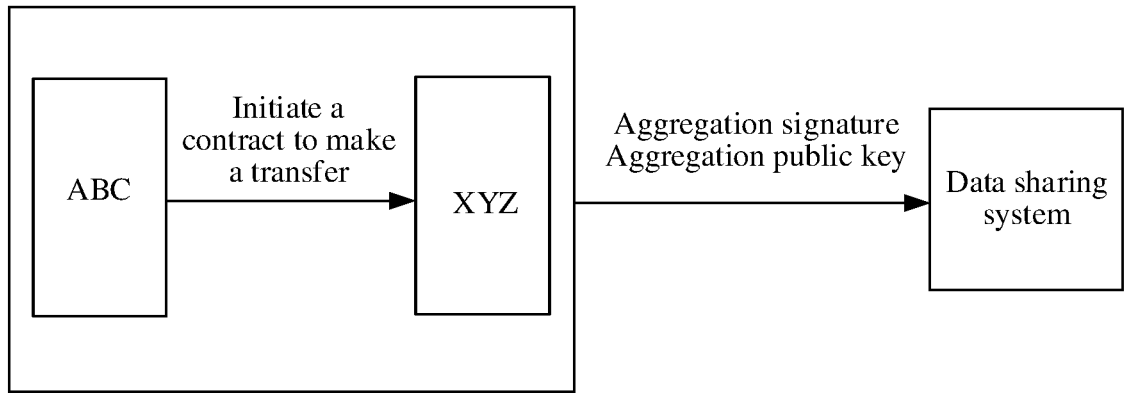
FIG. 8 is a schematic diagram of initiating a contract by a plurality of contract parties according to an example embodiment.

As shown in FIG. 8, when a plurality of parties jointly initiate a transfer in the contract, signatures of a plurality of contract parties are needed to reach the contract. When the plurality of contract parties operate respective client devices to make a transfer, the client devices receive a contract transfer request, the contract transfer request carries a to-be-signed message in this transaction, the message needs signatures of the plurality of contract parties, and the plurality of contract parties are triggered to start to generate signatures.

701: The first client device and the at least one second client device obtain a plurality of respective random numbers, and separately generate respective eigenvalues according to the plurality of random numbers.

When receiving a signature generation trigger instruction, the at least one second client device obtains the respective random number. The obtaining process may be processed with reference to operation 201, and details are not described herein again. After obtaining the random number of the at least one second client device, the at least one second client device generates the respective eigenvalue according to the respective random number. The generation method may be processed with reference to operation 201, and details are not described herein again. After generating the eigenvalue, the at least one second client device transmits the generated eigenvalue to the first client device.

702: The at least one second client device transmits the respective eigenvalues to the first client device.

703: The first client device generates a message abstract according to the contract data and at least one eigenvalue of the at least one second client device.

A process in which the first client device generates the message abstract may be processed with reference to the foregoing operation 202, and details are not described herein again.

704: The first client device transmits the message abstract to the at least one second client device.

705: The at least one second client device obtains the message abstract, and then the first client device and the at least one second client device obtain the contract data, the private key, and the public key.

A process in which the first client device and the at least one second client device obtain respective private keys and public keys may be processed with reference to operation 203, and details are not described herein again.

706: The first client device and the at least one second client device generate a sub signature according to the message abstract, the random number, and the private key.

A process in which the at least one second client device generates respective sub signatures may be processed with reference to the foregoing operation 203, and details are not described herein again.

707: The at least one second client device transmits the respective sub signature to the first client device.

708: The first client device obtains respective public keys of the first client device and the at least one second client device, and generates the aggregation public key according to the respective public keys of the first client device and the at least one second client device.

The first client device receives the public key and sub signature that are sent by the at least one second client device, and stores the received public key and sub signature. Then, a process in which the first client device generates the aggregation public key may be processed with reference to the foregoing operation 204, and details are not described herein again.

709: The first client device generates the aggregation signature according to a sum value of sub signatures of the first client device and the at least one second client device and the message abstract.

A process in which the first client device generates the aggregation signature may be processed with reference to the foregoing operation 205, and details are not described herein again.

710: The first client device adds the aggregation public key and the aggregation signature to contract data.

After generating the aggregation public key and the aggregation signature, the first client device adds the aggregation public key and the aggregation signature to contract data, and then transmits the contract data to the data sharing system. Further, each node of the data sharing system may perform signature check on the contract data based on the aggregation public key and the aggregation signature. When the signature check succeeds, the data sharing system stores the contract data, the aggregation public key, and the aggregation signature. Certainly, signature check may not be performed on the contract data, and the contract data, the aggregation public key, and the aggregation signature are directly stored. When the contract is executed, the aggregation public key and the aggregation signature are obtained from the data sharing system, and signature check is performed on the contract data according to the aggregation public key and the aggregation signature.

The length of the aggregation signature obtained in the foregoing process is less than the length of the signature obtained through splicing, and the length of the aggregation public key is less than the length of the public key obtained through splicing. Therefore, during network transmission of the aggregation signature, burden of network transmission can be reduced, and during storage of the aggregation public key and the aggregation signature, the storage space can be reduced.

The process of generating the aggregation signature and the aggregation public key may be parallel. Namely, the first client device of the aggregation party generates the aggregation sub signature according to a plurality of sub signatures, and then generates the aggregation signature according to the aggregation sub signature and the message abstract. Similarly, the first client device generates the aggregation public key according to a plurality of public keys. Optionally, the process of generating the aggregation signature and the aggregation public key may also be serial. Namely, the first contract party client device obtains its sub signature, and then transmits it to at least one second contract party client device. The at least one second contract party client device obtains the sub signature of the first contract party client device and a sub signature of the at least one second contract party client device, generates a partial aggregation sub signature, and then transmits it to a third contract party client device. The third contract party client device obtains the partial aggregation sub signature sent by the at least one second contract party client device, and a sub signature of the third contract party client device, generates a new partial aggregation sub signature, and then transmits it to a fourth contract party client device, and so on, until the last contract party client device generates a new partial aggregation sub signature, and transmits the partial aggregation sub signature to the aggregation party first client device. The aggregation party client generates an aggregation sub signature according to the partial aggregation sub signature and a sub signature of the aggregation party client, and then generates the aggregation signature according to the generated aggregation sub signature and the message abstract. However, this is merely an example and the disclosure not limited herein.

In the disclosure, an aggregation signature is generated by using sub signatures of a plurality of signature parties, and an aggregation public key is generated based on public keys of a plurality of signature parties; the length of the obtained aggregation signature is less than that of a multi-signature obtained by splicing the plurality of sub signatures, and the length of the aggregation public key is less than that of a multi public key obtained by splicing the plurality of public keys; therefore, during network transmission of the aggregation signature and the aggregation public key, burden of network transmission is reduced, and the storage space is reduced during storage, and during signature check, a signed message is checked directly using the aggregation public key and the aggregation signature, to greatly reduce the complexity of signature check. Further, specific application of the foregoing signature generation method in an intelligent contract scenario is provided, so that practicability of signature generation is improved, and efficiency of signature generation and signature check in the intelligent contract scenario is also improved.

Figure 9:
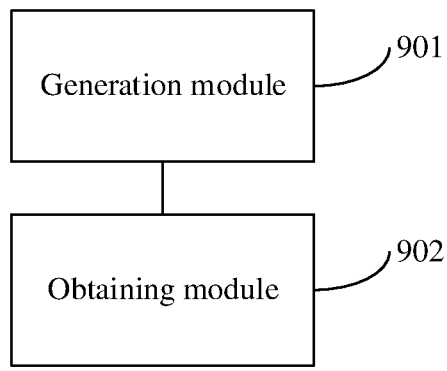
FIG. 9 is a schematic structural diagram of a signature generation apparatus according to an example embodiment.

FIG. 9 is a schematic structural diagram of a signature generation apparatus according to an example embodiment. Referring to FIG. 9, the apparatus includes a generation module 901 and an obtaining module 902.

The generation module 901 is configured to generate a message abstract according to a to-be-signed message and eigenvalues of a plurality of signature parties, an eigenvalue of each signature party being obtained through calculation according to a random number of the signature party.

The obtaining module 902 is configured to obtain public keys and sub signatures of the plurality of signature parties, a sub signature of each signature party being obtained through calculation according to the random number of the signature party, the message abstract, and private keys of the plurality of signature parties.

The generation module 901 is further configured to generate an aggregation public key according to the public keys of the plurality of signature parties, a length of the aggregation public key being less than a length of the plurality of public keys after splicing.

The generation module 901 is further configured to generate an aggregation signature according to a sum value of the plurality of sub signatures and the message abstract.

In any possible implementation, the generation module 901 includes an obtaining submodule 9011 and a generation submodule 9012.

The obtaining submodule 9011 is configured to obtain the eigenvalues of the plurality of signature parties, the to-be-signed message, and a first value.

The generation submodule 9012 is configured to generate an aggregation eigenvalue according to the eigenvalues of the plurality of signature parties and the first value.

The generation submodule 9012 is further configured to generate the message abstract according to the aggregation eigenvalue, the to-be-signed message, and a preset one-way hash function.

In any possible implementation, the generation submodule 9012 is further configured to:

calculate a product of the plurality of eigenvalues, and generate the aggregation eigenvalue according to the product of the plurality of eigenvalues and the first value.

In any possible implementation, the generation submodule 9012 is further configured to:

calculate a product of the plurality of public keys, and generate the aggregation public key according to the product of the plurality of public keys and the first value.

In any possible implementation, the generation module 901 is further configured to:

generate an aggregation sub signature according to the plurality of sub signatures, splice the aggregation sub signature and the message abstract, and determine a result obtained through splicing as the aggregation signature.

In any possible implementation, the plurality of signature parties is a plurality of account addresses provided by the client device, and the to-be-signed message contains value transfer information corresponding to each account address in a case that the method is applied to the client device in a data sharing system.

In any possible implementation, the to-be-signed message contains contract data, and the contract data is used to limit a condition of completing a transaction in a case that the method is applied to the client device in a data sharing system.

In any possible implementation, each of the plurality of signature parties is a follower node in the data sharing system in a case that the method is applied to a leader node in the data sharing system.

Correspondingly, the apparatus further includes:

a transmitting module 903, configured to transmit the message abstract to the follower node in the data sharing system after the generating a message abstract according to a to-be-signed message and eigenvalues of a plurality of signature parties.

The obtaining module 902 is further configured to:

receive a public key and a sub signature that are sent by each follower node.

The transmitting module 903 is further configured to:

transmit the aggregation public key and the aggregation signature to each follower node after the generating an aggregation signature according to a sum value of the plurality of sub signatures and the message abstract.

Figure 10:
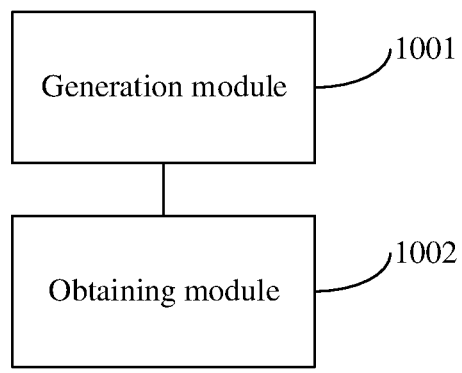
FIG. 10 is a schematic structural diagram of a signature generation apparatus according to an example embodiment.

FIG. 10 is a schematic structural diagram of a signature generation apparatus according to an example embodiment. Referring to FIG. 10, the apparatus includes a generation module 1001 and an obtaining module 1002.

The generation module 1001 is configured to: obtain a random number, and generate an eigenvalue according to the random number.

The obtaining module 1002 is configured to obtain a to-be-signed message, a private key, and a public key.

The obtaining module 1002 is further configured to obtain a message abstract, the message abstract being obtained through calculation by the signature aggregation party according to the to-be-signed message and the eigenvalue.

The generation module 1001 is configured to generate a sub signature according to the message abstract, the random number, and the private key.

In any possible implementation, the generation module 1001 is further configured to:

obtain a first value p and a second value q, the first value p and the second value q being primes, q being a factor of (p−1), $p \geq 2^{512}$, and $q \geq 2^{140}$;

obtain a generation base g, g satisfying that ($g^q$−1) can be exactly divided by p;

obtain the random number, a value range of the random number being (0,q); and generate the eigenvalue according to the random number, the generation base, and the first value.

In any possible implementation, the apparatus further includes:

a transmitting module 1003, configured to transmit the sub signature and the public key to the signature aggregation party in a case that the method is applied to a follower node in a data sharing system.

An example embodiment further provides an electronic apparatus, including: a processor; and a memory configured to store a computer program, the processor being configured to execute the computer program stored on the memory, to implement the following method operations: generating a message abstract according to a to-be-signed message and eigenvalues of a plurality of signature parties, an eigenvalue of each signature party being obtained through calculation according to a random number of the signature party; obtaining public keys and sub signatures of the plurality of signature parties, a sub signature of each signature party being obtained through calculation according to the random number of the signature party, the message abstract, and private keys of the plurality of signature parties; generating an aggregation public key according to the public keys of the plurality of signature parties, a length of the aggregation public key being less than a length of the plurality of public keys after splicing; and generating an aggregation signature according to a sum value of the plurality of sub signatures and the message abstract.

In a possible implementation, the processor is configured to: obtain the eigenvalues of the plurality of signature parties, the to-be-signed message, and a first value; generate an aggregation eigenvalue according to the eigenvalues of the plurality of signature parties and the first value; and generate the message abstract according to the aggregation eigenvalue, the to-be-signed message, and a preset one-way hash function.

In a possible implementation, the processor is configured to: calculate a product of the plurality of eigenvalues, and generate the aggregation eigenvalue according to the product of the plurality of eigenvalues and the first value.

In a possible implementation, the processor is configured to: calculate a product of the plurality of public keys, and generate the aggregation public key according to the product of the plurality of public keys and the first value.

In a possible implementation, the processor is configured to: generate an aggregation sub signature according to the plurality of sub signatures, splice the aggregation sub signature and the message abstract, and determine a result obtained through splicing as the aggregation signature.

In a possible implementation, the electronic apparatus is a client device in a data sharing system, the plurality of signature parties is a plurality of account addresses provided by the client device, and the to-be-signed message contains value transfer information corresponding to each account address.

In a possible implementation, the electronic apparatus is a client device in a data sharing system, the to-be-signed message contains contract data, and the contract data is used to limit a condition of completing a transaction.

In a possible implementation, the electronic apparatus is a leader node in a data sharing system, and each of the plurality of signature parties is a follower node in the data sharing system; and the electronic apparatus further includes: a transceiver, configured to transmit the message abstract to the follower node in the data sharing system; the transceiver is further configured to receive a public key and a sub signature that are sent by each follower node; and the processor is further configured to transmit the aggregation public key and the aggregation signature to each follower node.

Figure 11:
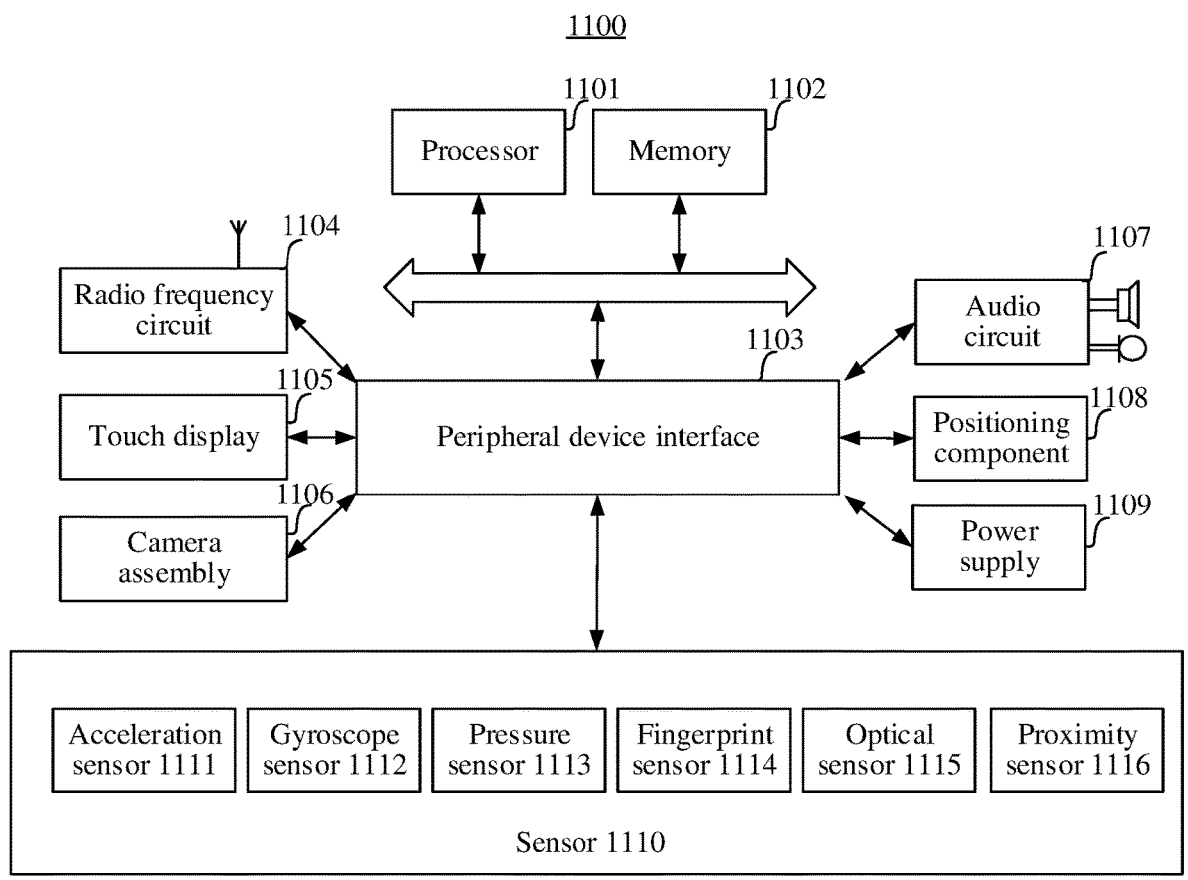
FIG. 11 is a structural block diagram of a terminal 1100 according to an example embodiment.

In an example, the foregoing electronic apparatus may be provided as a terminal 1100 shown in FIG. 11. FIG. 11 is a structural block diagram of a terminal 1100 according to an example embodiment. The terminal 1100 may be a personal computer (PC), a smartphone, a tablet computer, or the like. The terminal 1100 may also be referred to as user equipment, a portable terminal, another name, or the like.

In an example embodiment, the terminal 1100 includes a processor 1101 and a memory 1102.

The processor 1101 may include one or more processing cores, for example, a 4-core processor, or an 8-core processor. The processor 1101 may be implemented by at least one hardware form in digital signal processing (DSP), a field-programmable gate away (FPGA), and a programmable logic array (PLA). The processor 1101 may also include a main processor and a coprocessor. The main processor is a processor for processing data in an awake state, and is also referred to as a central processing unit (CPU). The coprocessor is a low-power processor for processing data in a standby status. In some embodiments, the processor 1101 may be integrated with a graphics processing unit (GPU), and the GPU is responsible for rendering and drawing content that needs to be displayed on the display. In some embodiments, the processor 1101 may further include an artificial intelligence (AI) processor. The AP processor is configured to process computing operations related to machine learning.

The memory 1102 may include one or more computer-readable storage media that may be tangible and non-transitory. The memory 1102 may also include a high speed random access memory, and a non-volatile memory, such as one or more magnetic disk storage devices and flash storage devices. In some embodiments, the non-transitory computer-readable storage medium in the memory 1102 is configured to store at least one instruction, the at least one instruction being executed by the processor 1101 to implement the signature generation method provided in the disclosure.

In some embodiments, the terminal 1100 further optionally includes: a peripheral device interface 1103 and at least one peripheral device. Specifically, the peripheral device includes, for example, at least one of a radio frequency circuit 1104, a touch display 1105, a camera 1106, an audio circuit 1107, a positioning component 1108, and a power supply 1109.

The peripheral device interface 1103 may be configured to connect at least one peripheral device related to an input/output (I/O) to the processor 1101 and the memory 1102. In some embodiments, the processor 1101, the memory 1102, and the peripheral device interface 1103 are integrated on a same chip or circuit board; in some other embodiments, any one or two of the processor 1101, the memory 1102, and the peripheral device interface 1103 may be implemented on a separate chip or circuit board. However, this is merely an example and the disclosure is not limited in this embodiment.

The radio frequency circuit 1104 is configured to receive and transmit a radio frequency (RF) signal, which is also referred to as an electromagnetic signal. The RF circuit 1104 communicates with a communication network and another communication device via electromagnetic signals. The RF circuit 1104 converts an electrical signal into an electromagnetic signal for transmission, or converts a received electromagnetic signal into an electrical signal. Optionally, the RF circuit 1104 includes an antenna system, an RF transceiver, one or more amplifiers, a tuner, an oscillator, a digital signal processor, a codec chipset, a subscriber identity module card, and the like. The RF circuit 1104 may communicate with another terminal via at least one wireless communication protocol. The wireless communication protocol includes, but is not limited to, the World Wide Web, a metropolitan area network, an intranet, generations of mobile communication networks (2G, 3G, 4G, and 5G), a wireless local area network, and/or a wireless fidelity (WiFi) network. In some embodiments, the radio frequency circuit 1104 may further include a near field communication (NFC) related circuit. However, this is merely an example and the disclosure is not limited.

The touch display 1105 is configured to display a user interface (UI). The UI may include graphics, text, icons, videos, and any combination thereof. The touch display 1105 also has the capability of collecting touch signals on or above a surface of the touch display 1105. The touch signal may be input into the processor 1101 as a control signal for processing. The touch display 1105 is configured to provide virtual buttons and/or virtual keyboards, also referred to as soft buttons and/or soft keyboards. In some embodiments, there may be one touch display 1105 disposed on a front panel of the terminal 1100; in some other embodiments, there may be at least two touch displays 1105, respectively disposed on different surfaces of the terminal 1100 or in a folded design. In some still other embodiments, the touch display 1105 may be a flexible display disposed on a curved surface or a folded surface of the terminal 1100. Even the touch display 1105 may be set to a non-rectangular irregular pattern, that is, a profiled screen. Even the touch display screen 1105 can be set to a non-rectangular irregular pattern, that is, a profiled screen. The touch display 1105 may be prepared by using a material such as a liquid crystal display (LCD) or an organic light-emitting diode (OLED).

The camera assembly 1106 is configured to collect images or videos. Optionally, the camera assembly 1106 includes a front camera and a rear camera. The front camera may be configured to implement a video call or selfie, and the rear camera may be configured to implement shooting of pictures or videos. In some embodiments, there are at least two rear cameras, which are respectively any one of a main camera, a depth of field camera, and a wide-angle camera, so that the main camera and the depth of field camera are combined to implement a bokeh function, and the main camera and the wide-angle camera are combined to implement panoramic shooting and virtual reality (VR) shooting functions. In some embodiments, the camera assembly 1106 may also include a flash. The flash may be a monochrome temperature flash or a two-color temperature flash. The two-color temperature flash is a combination of a warm-light flash and a cold-light flash, and can be used for light compensation at different color temperatures.

The audio circuit 1107 is configured to provide an audio interface between the user and the terminal 1100. The audio circuit 1107 may include a microphone and a speaker. The microphone is configured to: collect sound waves of the user and the environment, and convert the sound waves into electrical signals for input into the processor 1101 for processing, or into the RF circuit 1104 for voice communication. For the purpose of stereo collection or noise reduction, there may be a plurality of microphones respectively disposed at different parts of the terminal 1100. The microphone may also be an array microphone or an omnidirectional acquisition microphone. The speaker is configured to convert electrical signals from the processor 1101 or the RF circuit 1104 into sound waves. The speaker may be a conventional film speaker or a piezoelectric ceramic speaker. When the speaker is a piezoelectric ceramic speaker, not only can the electrical signal be converted into human audible sound waves, but also the electrical signal can be converted into sound waves that are inaudible to humans for ranging and the like. In some embodiments, the audio circuit 1107 may also include a headphone jack.

The positioning component 1108 is configured to position a current geographic location of the terminal 1100, to implement navigation or a location based service (LBS). The positioning component 1108 may be a positioning component based on a US global positioning system (GPS), a Chinese Beidou system, or a Russian Galileo system.

The power supply 1109 is configured to power various components in the terminal 1100. The power supply 1109 may be an alternating current, a direct current, a disposable battery, or a rechargeable battery. When the power supply 1109 includes a rechargeable battery, the rechargeable battery may be a wired rechargeable battery or a wireless rechargeable battery. A wired rechargeable battery is a battery that is charged by a wired line, and a wireless rechargeable battery is a battery that is charged by a wireless coil. The rechargeable battery can also be used to support a fast charging technology.

In some embodiments, the terminal 1100 further includes one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1116.

The acceleration sensor 1111 may detect the magnitude of an acceleration on three coordinate axes of a coordinate system established by the terminal 1100. For example, the acceleration sensor 1111 may be configured to detect components of a gravity acceleration on three coordinate axes. The processor 1101 may control the touch display 1105 to display the user interface in a landscape view or a portrait view according to the gravity acceleration signal collected by the acceleration sensor 1111. The acceleration sensor 1111 may also be configured to collect data of games or motion data of the user.

The gyroscope sensor 1112 may detect a body direction and a rotation angle of the terminal 1100, and the gyroscope sensor 1112 may cooperate with the acceleration sensor 1111 to collect a 3D motion of the user to the terminal 1100. According to the data collected by the gyroscope sensor 1112, the processor 1101 may implement the following functions: motion sensing (such as changing the UI according to the user's tilting operation), image stabilization at the time of shooting, game control, and inertial navigation.

The pressure sensor 1113 may be disposed at a side bezel of the terminal 1100 and/or a lower layer of the touch display 1105. When the pressure sensor 1113 is disposed at the side bezel of the terminal 1100, a user's holding signal to the terminal 1100 (e.g., a signal indicating that a user is holding the terminal 1100) may be detected, and left and right hand recognition or shortcut operation is performed according to the holding signal. When the pressure sensor 1113 is disposed on the lower layer of the touch display 1105, an operability control on the UI interface may be controlled according to the user's pressure operation on the touch display 1105. The operability control includes at least one of a button control, a scroll bar control, an icon control, and a menu control.

The fingerprint sensor 1114 is configured to collect a fingerprint of the user to identify the identity of the user according to the collected fingerprint. Upon identifying that the user's identity is a trusted identity, the processor 1101 authorizes the user to perform related sensitive operations including unlocking the screen, viewing encrypted information, downloading software, paying and changing settings, and the like. The fingerprint sensor 1114 may be disposed on the front side, back side, or side surface of the terminal 1100. When a physical button or manufacturer logo is disposed on the terminal 1100, the fingerprint sensor 1114 may be integrated with the physical button or the manufacturer logo.

The optical sensor 1115 is configured to collect ambient light intensity. In an embodiment, the processor 1101 may control display brightness of the touch display 1105 according to the ambient light intensity collected by the optical sensor 1115. Specifically, when the ambient light intensity is relatively high, the display brightness of the touch display 1105 is raised; when the ambient light intensity is relatively low, the display brightness of the touch display 1105 is lowered. In another embodiment, the processor 1101 may also dynamically adjust shooting parameters of the camera assembly 1106 according to the ambient light intensity collected by the optical sensor 1115.

The proximity sensor 1116, also referred to as a distance sensor, is usually disposed on the front side of terminal 1100. The proximity sensor 1116 is configured to collect a distance between the user and the front side of terminal 1100. In an embodiment, when the proximity sensor 1116 detects that the distance between the user and the front side of the terminal 1100 is gradually decreasing, the processor 1101 controls the touch display 1105 to switch from the bright screen state to the blackout screen state; when the proximity sensor 1116 detects that the distance between the user and the front side of the terminal 1100 is gradually increasing, the processor 1101 controls the touch display 1105 to switch from the blackout screen state to the bright screen state.

A person skilled in the art may understand that the structure shown in FIG. 11 does not constitute a limitation to the terminal 1100, and the terminal may include more components or fewer components than those shown in the figure, or some components may be combined, or a different component deployment may be used.

In an exemplary embodiment, a computer-readable storage medium is further provided, the storage medium storing at least one instruction, at least one program, and a code set or an instruction set, and the at least one instruction, the at least one program, and the code set or the instruction set being loaded and executed by the processor to implement the signature generation method provided in the foregoing embodiment. For example, the computer-readable storage medium may be a ROM, a random access memory (RAM), a CD-ROM, a magnetic tape, a floppy disk, an optical data storage device, or the like.

Figure 12:
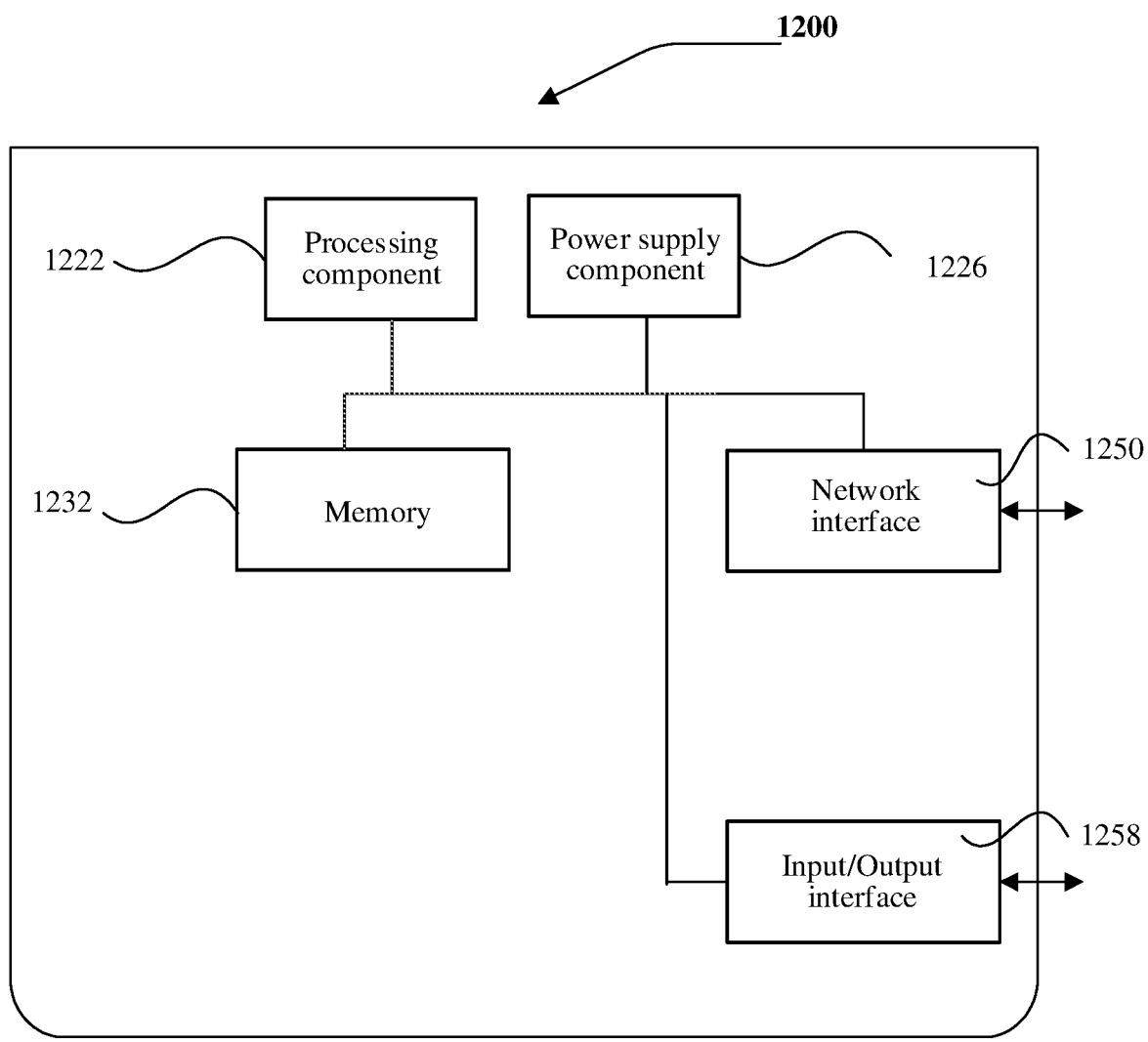
FIG. 12 is a structural block diagram of a server according to an example embodiment.

In an example, the foregoing electronic apparatus may be provided as a server 1200 shown in FIG. 12. FIG. 12 is a structural block diagram of a server according to an example embodiment. For example, the server 1200 may be provided as a node. Referring to FIG. 12, the server 1200 includes a processing component 1222, and the server 1200 further includes one or more processors, and a memory resource represented by a memory 1232. The memory resource is used for storing an instruction that can be executed by the processing component 1222, for example, an application program. The application program stored in the memory 1232 may include one or more modules each of which corresponds to a set of instructions. In addition, the processing component 1222 is configured to execute an instruction, to perform method operations of a server side in any signature generation method in the embodiments shown in FIG. 2, FIG. 4, and FIG. 7.

The server 1200 may further include a power supply component 1226 configured to execute power supply management of the server 1200, a wired or wireless network interface 1250 configured to connect the server 1200 to a network, and an input/output (I/O) interface 1258. The server 1200 may operate an operating system that is stored in the memory 1232, for example, Windows Server™, Mac OS X™, Unix™, Linux™, or FreeBSD™.

In an exemplary embodiment, a computer-readable storage medium is further provided, the storage medium storing at least one instruction, the at least one instruction being loaded and executed by the processor to implement the signature generation method provided in the foregoing embodiment. For example, the computer-readable storage medium may be a ROM, a RAM, a CD-ROM, a magnetic tape, a floppy disk, an optical data storage device, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and practicing the disclosure, a person skilled in the art would easily conceive of other implementations of the disclosure. The disclosure is intended to cover any variation, use, or adaptive change of the disclosure. These variations, uses, or adaptive changes follow the general principles of the disclosure and include common general knowledge or common technical means, which are not disclosed in the present disclosure, in the art. The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A signature generation method, performed by an electronic apparatus, the method comprising:
generating a message abstract according to a to-be-signed message and eigenvalues of a plurality of signature parties, an eigenvalue of a signature party being based on a random number of the signature party;
obtaining public keys and sub signatures of the plurality of signature parties, a sub signature of the signature party being based on the random number of the signature party, the message abstract, and private keys of the plurality of signature parties;
generating an aggregation public key according to the public keys of the plurality of signature parties, a length of the aggregation public key being less than a length of the public keys after splicing; and
generating an aggregation signature according to a sum value of the sub signatures and the message abstract,
wherein the generating the message abstract comprises:
obtaining eigenvalues of the plurality of signature parties, the to-be-signed message, and a first value;
generating an aggregation eigenvalue according to the eigenvalues of the plurality of signature parties and the first value; and
generating the message abstract according to the aggregation eigenvalue, the to-be-signed message, and a preset one-way hash function.

2. The method according to claim 1, wherein the generating the aggregation eigenvalue comprises:
calculating a product of the eigenvalues, and generating the aggregation eigenvalue according to the product of the eigenvalues and the first value.

3. The method according to claim 1, wherein the generating the aggregation public key comprises:
calculating a product of the public keys, and generating the aggregation public key according to the product of the public keys and the first value.

4. The method according to claim 1, wherein the generating the aggregation signature comprises:
generating an aggregation sub signature according to the sub signatures, splicing the aggregation sub signature and the message abstract, and generating the aggregation signature based on a result of the splicing.

5. The method according to claim 1, wherein the electronic apparatus corresponds to a client device in a data sharing system, the plurality of signature parties correspond to a plurality of account addresses provided by the client device, and the to-be-signed message contains value transfer information corresponding to each account address.

6. The method according to claim 1, wherein the electronic apparatus corresponds to a client device in a data sharing system, and the to-be-signed message contains contract data used to limit a condition of completing a transaction.

7. The method according to claim 1, wherein the electronic apparatus corresponds to a leader node in a data sharing system, and each of the plurality of signature parties corresponds to a follower node in the data sharing system, and wherein the obtaining the public keys and the sub signatures of the plurality of signature parties comprises receiving a public key and a sub signature that are sent by each follower node, the method further comprising:

transmitting the message abstract to the follower node in the data sharing system; and transmitting the aggregation public key and the aggregation signature to each follower node.

8. An electronic apparatus, comprising:

at least one memory operable to store program code; and at least one processor operable to read the program code and operate as instructed by the program code, the program code comprising:

first generation code configured to cause at least one of the at least one processor to generate a message abstract according to a to-be-signed message and eigenvalues of a plurality of signature parties, an eigenvalue of a signature party being based on a random number of the signature party;

obtainment code configured to cause at least one of the at least one processor to obtain public keys and sub signatures of the plurality of signature parties, a sub signature of the signature party being based on the random number of the signature party, the message abstract, and private keys of the plurality of signature parties;

second generation code configured to cause at least one of the at least one processor to generate an aggregation public key according to the public keys of the plurality of signature parties, a length of the aggregation public key being less than a length of the public keys after splicing; and third generation code configured to cause at least one of the at least one processor to generate an aggregation signature according to a sum value of the sub signatures and the message abstract, wherein the first generation code causes at least one of the at least one processor to: obtain the eigenvalues of the plurality of signature parties, the to-be-signed message, and a first value; generate an aggregation eigenvalue according to the eigenvalues of the plurality of signature parties and the first value; and generate the message abstract according to the aggregation eigenvalue, the to-be-signed message, and a preset one-way hash function.

9. The electronic apparatus according to claim 8, wherein the first generation code causes at least one of the at least one processor to generate the aggregation eigenvalue by performing: calculating a product of the eigenvalues, and generating the aggregation eigenvalue according to the product of the eigenvalues and the first value.

10. The electronic apparatus according to claim 8, wherein the first generation code causes at least one of the at least one processor to generate the aggregation eigenvalue by performing: calculating a product of the public keys, and generating the aggregation public key according to the product of the public keys and the first value.

11. The electronic apparatus according to claim 8, wherein the second generation code causes at least one of the at least one processor to: generate an aggregation sub signature according to the sub signatures, splice the aggregation sub signature and the message abstract, and generate the aggregation signature based on a result of splicing.

12. The electronic apparatus according to claim 8, wherein the electronic apparatus corresponds to a client device in a data sharing system, the plurality of signature parties correspond to a plurality of account addresses provided by the client device, and the to-be-signed message contains value transfer information corresponding to each account address.

13. The electronic apparatus according to claim 8, wherein the electronic apparatus corresponds to a client device in a data sharing system, and the to-be-signed message contains contract data used to limit a condition of completing a transaction.

14. The electronic apparatus according to claim 8, wherein the electronic apparatus corresponds to a leader node in a data sharing system, and each of the plurality of signature parties is a follower node in the data sharing system;

the electronic apparatus further comprises: a transceiver, configured to transmit the message abstract to the follower node in the data sharing system, the transceiver is further configured to receive a public key and a sub signature that are sent by each follower node, and the program code further comprises transmission code configured to cause at least one of the at least one processor to transmit the aggregation public key and the aggregation signature to each follower node.

15. A non-transitory computer-readable storage medium, storing a computer program executable by at least one processor to perform:

generating a message abstract according to a to-be-signed message and eigenvalues of a plurality of signature parties, an eigenvalue of a signature party being based on a random number of the signature party;

obtaining public keys and sub signatures of the plurality of signature parties, a sub signature of the signature party being based on the random number of the signature party, the message abstract, and private keys of the plurality of signature parties;

generating an aggregation public key according to the public keys of the plurality of signature parties, a length of the aggregation public key being less than a length of the public keys after splicing; and generating an aggregation signature according to a sum value of the sub signatures and the message abstract, wherein the generating the message abstract comprises:

obtaining the eigenvalues of the plurality of signature parties, the to-be-signed message, and a first value;

generating an aggregation eigenvalue according to the eigenvalues of the plurality of signature parties and the first value; and generating the message abstract according to the aggregation eigenvalue, the to-be-signed message, and a preset one-way hash function.

16. The storage medium according to claim 15, wherein the generating the aggregation eigenvalue comprises calculating a product of the eigenvalues, and generating the aggregation eigenvalue according to the product of the eigenvalues and the first value; and/or wherein the generating the aggregation public key comprises calculating a product of the public keys, and generating the aggregation public key according to the product of the public keys and the first value.

17. The storage medium according to claim 15, wherein the generating the aggregation signature comprises:
generating an aggregation sub signature according to the sub signatures, splicing the aggregation sub signature and the message abstract, and generating the aggregation signature based on a result of the splicing.

\* \* \* \* \*